(12) United States Patent
Caillot

(10) Patent No.: US 10,308,227 B2
(45) Date of Patent: Jun. 4, 2019

(54) WIPER BLADE INCLUDING A DEVICE AND A MEANS FOR SPRAYING A WASHING LIQUID

(71) Applicant: Gérald Caillot, Cernay la Ville (FR)

(72) Inventor: Gérald Caillot, Cernay la Ville (FR)

(73) Assignee: Valeo Systèmes d'Essuyage, Les Mesnil Saint-Denis (FR)

( * ) Notice: Subject to any disclaimer, the term of this patent is extended or adjusted under 35 U.S.C. 154(b) by 737 days.

(21) Appl. No.: 14/406,536

(22) PCT Filed: Jun. 13, 2013

(86) PCT No.: PCT/FR2013/051388
§ 371 (c)(1),
(2) Date: Dec. 9, 2014

(87) PCT Pub. No.: WO2013/186498
PCT Pub. Date: Dec. 19, 2013

(65) Prior Publication Data
US 2015/0143655 A1    May 28, 2015

(30) Foreign Application Priority Data

Jun. 13, 2012 (FR) ..................... 12 55521

(51) Int. Cl.
*B60S 1/52* (2006.01)
*B60S 1/08* (2006.01)

(52) U.S. Cl.
CPC ............. *B60S 1/524* (2013.01); *B60S 1/0848* (2013.01)

(58) Field of Classification Search
CPC ......... B60S 1/3862; B60S 1/524; B60S 1/522

USPC ................. 15/250.04, 250.201; 239/284.1
See application file for complete search history.

(56) References Cited

U.S. PATENT DOCUMENTS

| 3,088,155 A | * | 5/1963 | Smithers | ............... B60S 1/3806 15/250.201 |
|---|---|---|---|---|
| 5,713,099 A | * | 2/1998 | Maubray | ............... B60S 1/3806 15/250.201 |
| 7,316,362 B2 | * | 1/2008 | Miyauchi | .................. B05B 1/08 239/102.1 |
| 2007/0018013 A1 | * | 1/2007 | Lasebnick | ............... B05B 1/042 239/284.1 |

(Continued)

FOREIGN PATENT DOCUMENTS

| DE | 1912037 A1 * | 9/1970 | ............ B60S 1/3415 |
|---|---|---|---|
| DE | 1 755 762 A1 | 11/1971 | |

(Continued)

OTHER PUBLICATIONS

DE1912037A1 (machine translation), 1970.*

(Continued)

*Primary Examiner* — Andrew A Horton
(74) *Attorney, Agent, or Firm* — Osha Liang LLP

(57) ABSTRACT

The invention relates to a blade 1 for wiping a vehicle window, including at least one device 2 for spraying a liquid for washing the window, arranged in order to spray said washing liquid onto a first area 61 of the window wiped by the wiper blade 1, characterized by including a means 3 for spraying the washing liquid, arranged such as to spray the washing liquid onto at least one area of the window other than the first area 61, referred to as second area 62. The invention is useful in motor vehicles.

17 Claims, 5 Drawing Sheets

(56) References Cited

U.S. PATENT DOCUMENTS

2013/0152320 A1* 6/2013 Matsumoto ........... B60S 1/3801
15/250.01

FOREIGN PATENT DOCUMENTS

| DE | 2 039 672 A1 | 2/1972 |
| DE | 41 16 720 A1 | 11/1991 |
| EP | 0 860 336 A1 | 8/1998 |
| WO | 2012/144547 A1 | 10/2012 |

OTHER PUBLICATIONS

DE2039672A1 (machine translation), 1972.*
International Search Report for corresponding International Application No. PCT/FR2013/051388, dated Oct. 9, 2013 (3 pages).

* cited by examiner

WIPER BLADE INCLUDING A DEVICE AND A MEANS FOR SPRAYING A WASHING LIQUID

BACKGROUND

The technical sector of the present invention is that of wiper blades used to remove water present on a window of a vehicle, in particular a motor vehicle. Such a wiper blade is in particular intended to be installed on a windscreen of this vehicle.

Motor vehicles are currently equipped with a wiping installation and a washing system to wipe the windscreen and prevent the driver's vision of his environment being disrupted by rain or dirt projections. Such a wiper installation comprises two wiper blades which scrape the outer surface of the windscreen so as to remove the water present on this surface.

It is also known to equip this vehicle with a washing installation which is arranged to spray washing liquid onto the windscreen, so as to facilitate dissolution of the dirt and thus improve the cleaning quality of the windscreen. This washing installation then comprises at least two separate nozzles installed on the bonnet of the vehicle, one of the nozzles being dedicated to spraying a zone of the windscreen situated in front of the vehicle driver, while the other nozzle is intended for spraying a zone of the windscreen situated in front of the front-seat passenger of the vehicle.

The drawback of such a solution lies in the fact that it is necessary to duplicate several components and supply these with washing liquid via a network of transport tubes. Thus such a technical solution is worthy of rationalisation, in particular so as to reduce the cost of the washing function.

It is also known to control the movement of the wiper blades automatically by means of a rain detector installed on the windscreen of the vehicle. When the latter detects the presence of water droplets on the windscreen, it transmits information allowing automatic starting of the wiping system.

Such a rain detector is generally installed in the upper part of the windscreen. Also, the good function of this detector is influenced by the state of cleanliness of the part of the windscreen at which the rain detector is installed. It may therefore be necessary to clean this area.

A drawback of this situation lies in the fact that washing systems known to date do not spray a sufficiently large quantity of washing liquid onto the part of the windscreen where the rain detector is installed.

Another drawback of this situation lies in the fact that the washing systems must as priority spray the washing liquid over a large portion of the windscreen, so as to clean the field of vision of the driver or passenger. However, such a spraying priority is detrimental to the upper part of the windscreen where the rain detector is installed, since this receives only a small amount of washing liquid.

In any case, and when the washing liquid succeeds in reaching the upper part of the windscreen, it is evacuated by the wiper installation immediately after contact with the face of the windscreen at the point at which the detector is installed. The washing liquid does not therefore have the time necessary to dissolve the particles on the upper part of the windscreen.

It is therefore understood that the part of the windscreen where the rain detector is installed is not washed effectively, which can lead to detection errors of this rain detector and consequently lead to an undesirable operation of the wiping system.

SUMMARY OF DISCLOSURE

The object of the invention is to resolve the drawbacks described above by proposing a wiper blade for a window of a vehicle, comprising at least one device for spraying a washing liquid, arranged to spray said washing liquid over a first zone of the window wiped by the wiper blade, innovative in that it comprises a means for spraying the washing liquid which is arranged to spray the washing liquid over at least one zone of the window different from the first zone, called the second zone.

The spraying device is thus arranged to spray the washing liquid upstream or downstream of the wiper blade, while the spraying means is configured to spray the washing liquid substantially along a longitudinal axis along which the wiper blade extends according to the invention. In other words, the washing device sprays a zone situated perpendicular to the longitudinal axis and contained between two longitudinal ends of the wiper blade, whereas the spraying means sends the washing liquid outside this zone.

Thanks to a single wiper blade fitted with this spraying assembly, firstly the zone of the windscreen facing the driver is cleaned and secondly the zone of the windscreen facing the front-seat passenger of the vehicle is cleaned. In addition, such a technical solution guarantees in particular good cleaning of the zone in which the rain detector is positioned.

According to one embodiment, the wiper blade may comprise at least one first pipe which is able to conduct the washing liquid and is in communication with the spraying means. According to a variant, the first pipe conducts the washing liquid solely towards the spraying means. According to a complementary variant, the first pipe also conducts the washing liquid to the spraying device.

The wiper blade extends along a longitudinal axis and comprises a first end and a second end in the longitudinal axis, the spraying means being installed at one of the ends of the wiper blade. One of the ends, called the second end, may be arranged close to a rotation point of the wiper blade, this second end receiving the spraying device. The other end, called the first end, is opposite the second end in relation to the wiper blade and in particular receives the spraying means.

According to an exemplary embodiment, the spraying means may be a first cap comprising a circulation channel for the washing liquid and at least one distribution means for the washing liquid which is in communication with a circulation channel and arranged to spray the washing liquid over the second zone of the window.

In such a case, the distribution means may be a hole opening in a wall of the first cap. This hole may open in a face of the first cap opposite a portion of the first cap through which the end of the wiper blade is inserted.

According to an alternative, the distribution means may be a pierced ball housed in a first wall of the first cap. The pierced ball is thus installed at an end of the circulation channel arranged in the first cap.

According to an example of the invention, the wiper blade may comprise a second pipe which is able to conduct the washing liquid and is in communication with the spraying device. The wiper blade then comprises the first pipe, assigned for example to the spraying means, and the second pipe assigned to the spraying device.

According to one embodiment, the spraying device may comprise at least a multiplicity of holes arranged in and along the second pipe. The combination of this multiplicity of holes with the second pipe forms a spray bar for the washing liquid.

According to an alternative or complementary embodiment, the spraying device may comprise at least one second cap installed at one end of the wiper blade, said second cap comprising at least one atomisation orifice arranged to spray the washing liquid over the first zone of the window.

The invention also concerns a wiper system for a window of a vehicle, comprising a first wiper blade incorporating any of the characteristics described above and able to wipe the first zone of the window, and a second wiper blade able to wipe the second zone of the window.

A first advantage of the invention lies in the fact that it is possible to simplify the spraying installation by eliminating all spraying means normally assigned to the zone of the windscreen situated in front of the passenger. For example, it is possible to omit the nozzle positioned on the bonnet opposite this zone. It is also possible to eliminate the network of supply tubes to this nozzle. The technical solution provided by the invention furthermore allows the use of a wiper blade of simple design, which allows a reduction in the cost of the wiping function.

Another advantage lies in the fact that the means for spraying the washing liquid is specifically dedicated to spraying the part of the windscreen at which an element, for example a rain detector, may be installed. The function of this spraying means can thus be assigned as priority to cleaning the respective part of the windscreen.

The invention also allows spraying of a large quantity of washing liquid on this upper part of the windscreen, thus promoting its good cleaning.

Finally, the offset in movement between the two wiper blades guarantees a minimum time for depositing the washing liquid on the part of the windscreen at which the rain detector may be installed, before the passage of the blade dedicated to sweeping this part of the windscreen.

Further characteristics, details and advantages of the invention will arise more clearly from reading the description below, given for information, in relation to the drawings described below.

DETAILED DESCRIPTION

Figure 1:
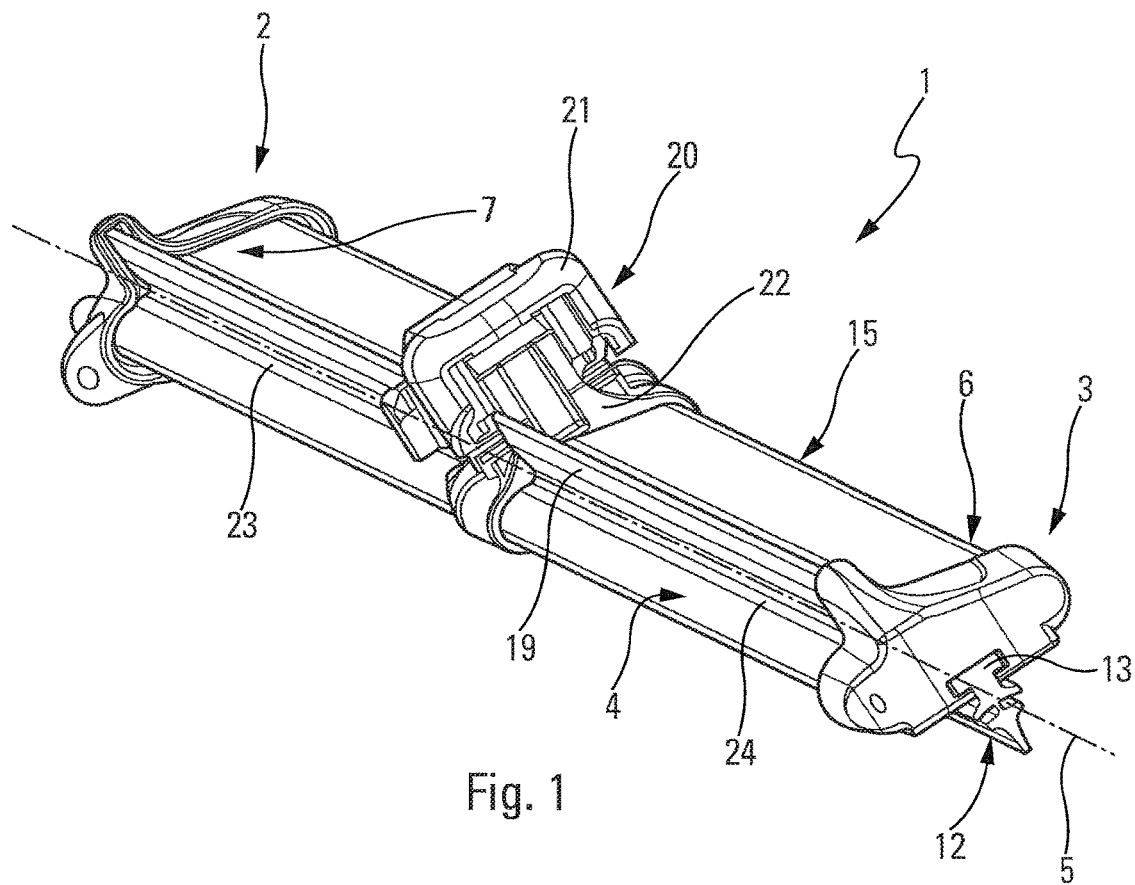
FIG. 1 is a perspective view of a wiper blade according to the invention.

FIG. 1 shows an exemplary embodiment of a wiper blade 1 according to the invention. Such a wiper blade 1 is intended to be rested on an outer face of a window of a vehicle, wherein this window may be a front windscreen or rear screen of said vehicle. In the description which follows, the term 'windscreen' will be used as an example application of the window.

The wiper blade performs a movement over the outer face of the windscreen so as to evacuate the water present thereon. The movement may for example be a rotation about a rotation point, the latter being linked to the wiper blade 1 via an arm. The wiper blade 1 thus describes a path over the outer face of the windscreen between a rest position, in which the blade is installed at the foot of the windscreen, and an extreme position in which the wiper blade 1 is at least parallel to a pillar of the vehicle at the edge of the windscreen.

The wiper blade 1 according to the invention thus wipes a first zone of the windscreen, this first zone corresponding to the path of said blade over the outer face of the windscreen.

The windscreen also comprises at least one zone which is not swept by the wiper blade 1 according to the invention. This zone, different from the first zone, is referred to below as the second zone of the windscreen. These zones will be identified with reference to FIG. 10.

The wiper blade 1 comprises a device 2 for spraying a washing liquid. The latter is contained in a reservoir installed on the vehicle and is circulated to the wiper blade 1 by a pump and/or a module for managing the circulation of the washing liquid.

The function of the spraying device 2 is to spray the washing liquid onto the zone of the windscreen swept by the wiper blade 1 carrying this spraying device, this zone here being the first zone.

According to the invention, the wiper blade 1 comprises a means 3 for spraying the washing liquid, the structure of which is configured to spray the washing liquid onto the second zone of the windscreen, i.e. the zone which is not swept by the wiper blade 1 carrying such a spraying means 3.

To supply this spraying means 3 with washing liquid, the wiper blade 1 is fitted with at least one washing liquid transport pipe, referred to below as the first pipe 4. According to an exemplary embodiment, such a pipe may be formed by a separate tube fixed to the wiper blade, so as to supply the washing liquid to the spraying means 3. According to another exemplary embodiment, the first pipe 4 may be formed by a tube arranged inside one of the constituent elements of the wiper blade 1, as will be explained below. In either of the alternatives mentioned above, the first pipe 4 is in communication with the spraying means 3. Throughout the description, and whichever elements are in communication, such an expression in general means that the first pipe 4 is connected directly or indirectly to the spraying means 3, such that the washing liquid passing through the first pipe 4 can reach the spraying means 3 before being sprayed onto the second zone of the windscreen.

The first pipe 4 may be assigned to supply washing liquid only to the spraying means 3. Alternatively the first pipe 4 may also be in communication with the spraying device 2. This means that a single first pipe 4 may conduct the washing liquid both to the spraying device 2 and to the spraying means 3.

The wiper blade 1 extends along a longitudinal axis marked 5 on FIG. 1. This wiper blade 1 is thus terminated by two longitudinal ends, called the first end 6 and the second end 7. The second end 7 of the wiper blade 1 is that which is closest to the rotation point of the arm carrying the wiper blade 1, while the first end 6 is that opposite the second end 7 in relation to the body of the wiper blade 1.

According to one aspect of the invention, the spraying means 3 is installed on the first end 6 of the wiper blade 1. The spraying device 2 may itself be installed on the second end 7, as shown for illustration on FIG. 1.

According to the exemplary embodiment, the wiper blade 1 may be of the scraper and spreader beam type. It may also be a flat blade as shown in FIGS. 1, 2, 8 and 9.

In this second alternative, the wiper blade 1 comprises a support 8 within which at least one stiffening spine 9 is housed. The support 8 is a plastic part in which a central cavity 10 is arranged, which is closed along the wiper blade 1 and open at the first and second ends 6 and 7 of this wiper blade 1. This central cavity 10 is also closed at the longitudinal ends of the wiper blade by the spraying means 3 and the spraying device 2.

The stiffening spine 9 extends inside this central cavity 10 and is formed in particular by a metallic strip which forces the wiper blade 1 to assume a concave profile when not applied to the windscreen.

Alternatively the wiper blade 1 may comprise two stiffening spines. In this case the two spines are attached to a wiping strip 12 forming part of the wiper blade 1 which has no support 8. The wiping strip 12 may have two slots which are open along the wiper blade 1 and arranged laterally thereon, the two slots each holding a stiffening spine.

The support 8 also comprises a longitudinal housing 11 in which the scraper is inserted, also known as the wiping strip 12. The latter is a flexible component of the wiper blade resting against the outer face of the windscreen. The wiping strip 12 comprises a lug 13 which extends into the longitudinal housing 11, this lug 13 being held between two flanks 14 constituting the support 8 and surrounding the lug 13.

On its upper part, the support 8 is covered by an air deflector 15 arranged to utilise the dynamic effect of the motion of the vehicle to increase the contact force of the wiper blade 1 on the windscreen. This air deflector 15 is attached to the support 8 by means of two clips 16, which each clip into a groove 17 provided in the support 8 and arranged on either side of a plane of symmetry 18 passing through the wiping strip 12 and the support 8. It is understood that the air deflector 15 surrounds the upper part of the support 8.

The air deflector 15 also comprises a fin 19 which extends along the wiper blade 1 in a plane substantially parallel to the plane of symmetry 18.

According to one exemplary embodiment, the air deflector 15 is the constituent part of the wiper blade 1 in which the first pipe 4 is arranged, which conducts the washing liquid. It is therefore in this way that the liquid can reach the spraying means 3 and where applicable the spraying device 2.

The stiffening spines 9, the wiping strip 12 and in some cases the support 8 extend without interruption from the first end 6 to the second end 7. The air deflector 15 may itself be formed in two separate portions 23 and 24 mounted on the support 8 of the wiper blade 1.

Substantially in the center of the wiper blade 1, for example between the two portions 23 and 24 constituting the air deflector 15, is a means 20 for fixing the wiper blade 1 to the arm which generates its movement, in particular its rotation.

This fixing means 20 comprises at least one adapter 21 connected by a pivot link to a connector 22. The latter ensures the mechanical fixing on the stiffening spines 9, while the function of the adapter 21 is to provide a mechanical connection between a distal end of the arm and the connector 22. Such an adapter 21 is consequently a part of which the shape can be modified according to the shape of the end of the arm, for example a straight end, a hook shape, or having a pivot finger and one or more fixing lugs.

The connector 22 may comprise a means for bringing the first pipe 4, formed in each of the constituent portions 23 and 24 of the air deflector 15, into communication. In particular this is the case when the washing liquid enters the wiper blade 1 via the spraying device 2, as will be described with reference to FIGS. 6 and 7.

Alternatively, the connector 22 may be configured to form the entry point of the washing liquid in the wiper blade 1. In such a situation, the connector 22 comprises an inlet sleeve to which a tube of the washing liquid supply device is connected. The connector 22 also comprises channels connected to this inlet sleeve and in communication with the pipes formed in the constituent portions 23 and 24 of the air deflector 15.

Figure 3:
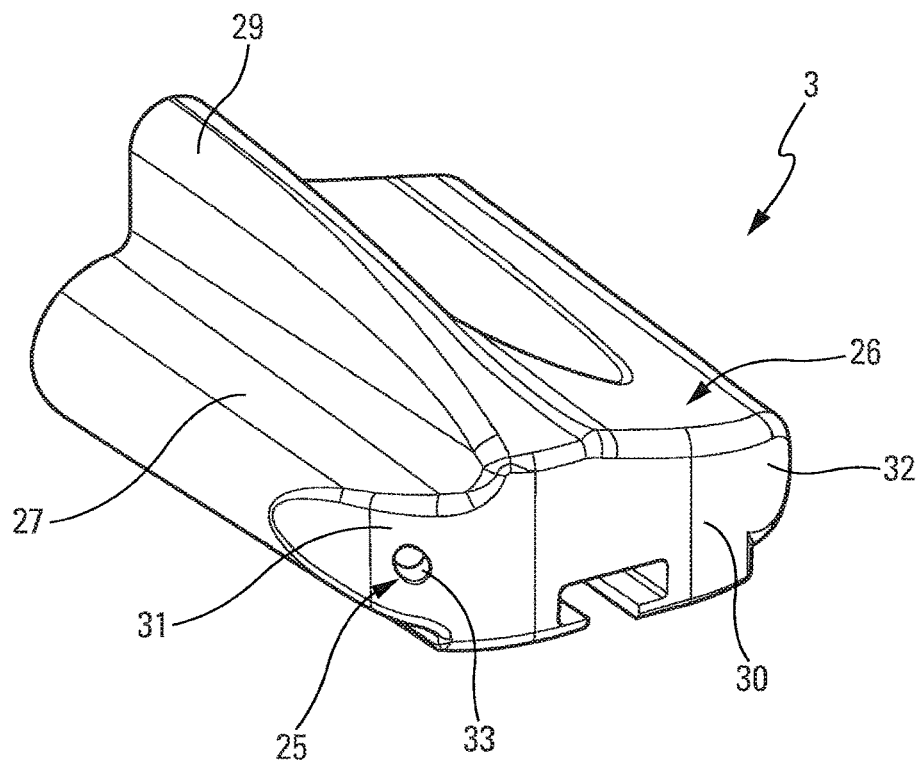
FIG. 3 is a view of the spraying means installed on the wiper blade according to the invention, in perspective from a first side.
Figure 4:
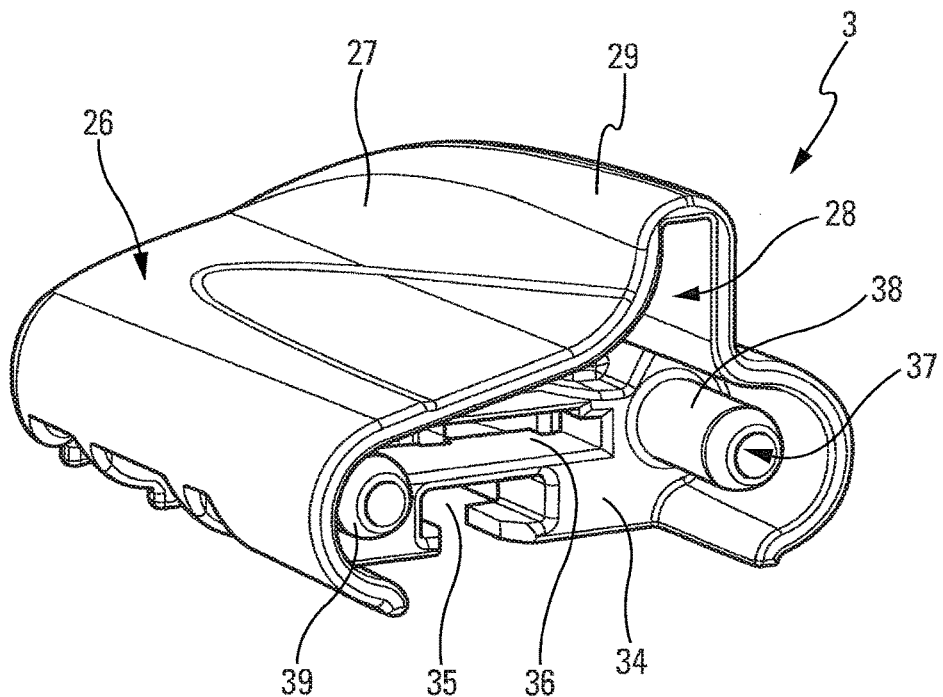
FIG. 4 is a view of the spraying means installed on the wiper blade according to the invention, in perspective from a second side.
Figure 5:
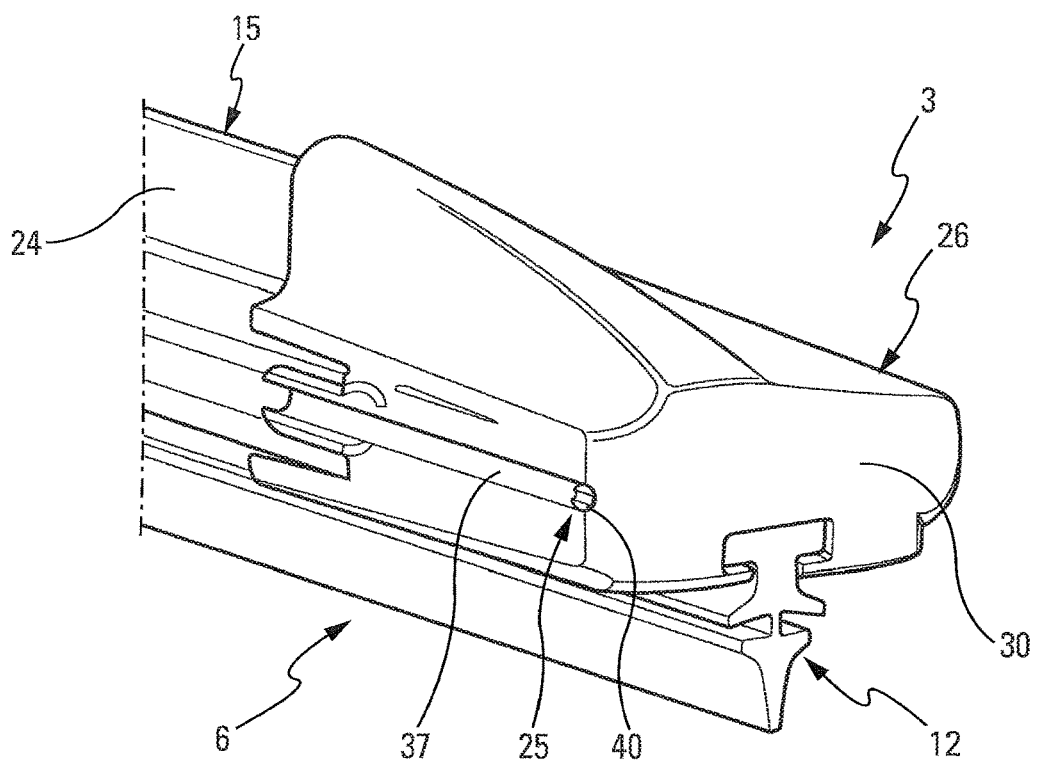
FIG. 5 is a truncated perspective view of the spraying means mounted on the wiper blade.

FIGS. 3 and 4 illustrate an exemplary embodiment of the spraying means 3, shown independently of the wiper blade 1, whereas FIG. 5 shows the spraying means 3 fitted on the first end 6 of the wiper blade 1 according to the invention.

FIG. 3 is a perspective view showing a first side of the spraying means 3 on which the washing liquid distribution means 25 open, while FIG. 4 is a perspective view showing an opposite side of the spraying means 3, illustrating more particularly the interior of the spraying means 3.

This spraying means 3 is formed by a first cap 26 i.e. a part which threads onto the first end of the wiper blade and comes to rest against this. This first cap 26 in particular overlaps the spines, the air deflector and in some cases the support constituting the wiper blade. Such a first cap 26 holds at least two of these components together, adantageously all three.

The first cap 26 comprises a wall 27 defining an open volume 28 housing at least the air deflector of the wiper blade. The shape of the wall 27 is thus complementary to the outer shape of the air deflector. For this reason the spraying means 3 comprises a deflector wing 29 which caps the fin formed on the air deflector of the wiper blade according to the invention.

The first cap 26 is terminated by a face 30 which joins the lateral sides of the first cap via radii 31 and 32. The distribution means 25 opens at this face 30, for example at the level of the one of the radii, e.g. the radius situated immediately adjacent to the deflector wing 29.

According to an exemplary embodiment shown on FIGS. 3 to 5, the distribution means 25 takes the form of a hole 33 passing through the wall constituting part of the first cap 26. The diameter of this hole 33 is calibrated to produce a jet of washing liquid at a specific distance from the first cap 26.

FIG. 4 shows certain internal forms of the spraying means 3. Inside the open volume 24 is a body 34 produced integrally with the wall 28. A groove 35 is arranged in the body 34 to receive the lug of the wiping strip in a manner similar to the mechanical connection created between this lug and the support of the wiper blade.

Between this groove 35 and the wall 27, the body 34 comprises a niche 36 in which a longitudinal end of the spine of the wiper blade is housed.

The first cap 26 forming the spraying means furthermore comprises a washing liquid circulation channel 37. Such a channel is formed by a concave portion of the first cap 26, this channel 37 being in communication with the distribution means 25.

In this particular example, the channel 37 is formed partly in the body 34 and partly in a first protuberance 38 which arises from the body 34 and extends into the inner volume 28. Such a first protuberance 38 is configured to enter into the first pipe formed for example at the air deflector of the wiper blade.

A second protuberance 39 may arise from the body 34 of the first cap 26, and is then arranged opposite the first protuberance 38 in relation to the niche 36. This first protuberance 38 may be configured to enter into a second pipe formed in the wiper blade, such a technical solution being explained further below.

FIG. 5 shows a perspective view of the spraying means 3 cut along an axis passing through the center of the washing liquid circulation channel 37. The channel 37 is straight and terminates in the distribution means 25.

According to an exemplary embodiment of the distribution means 25, the end of the circulation channel 37 opening at the face 30 of the first cap 26 has a spherical form in which a pierced ball 40 is housed. The equally spherical form of the latter allows the jet of washing liquid to be oriented in a multiplicity of directions, to adapt the spray of washing liquid.

The description above refers to a spraying means 3 equipped with a single distribution means 25 combined with a single washing liquid circulation channel 37. According to an alternative, it is naturally possible to provide a second channel in the first cap 26, combined with a second distribution means. Thus a spraying means is formed with two spray orifices.

Figure 6:
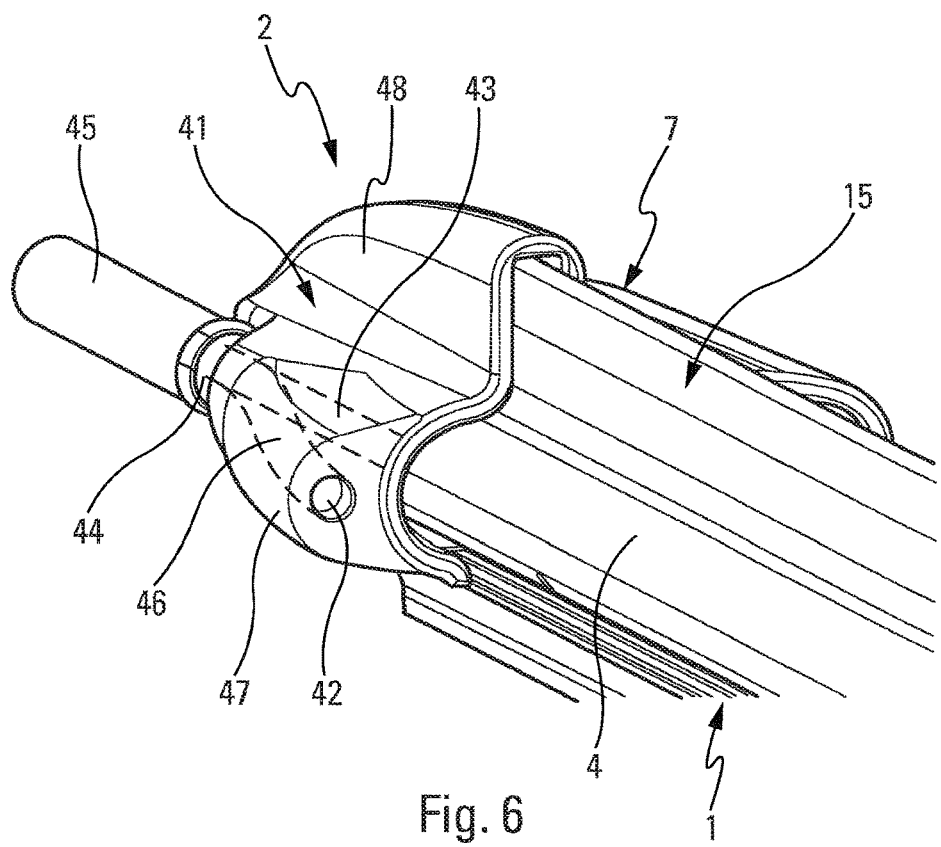
FIG. 6 is a perspective view of a longitudinal end of the wiper blade according to the invention, illustrating the presence of a spraying device.
Figure 7:
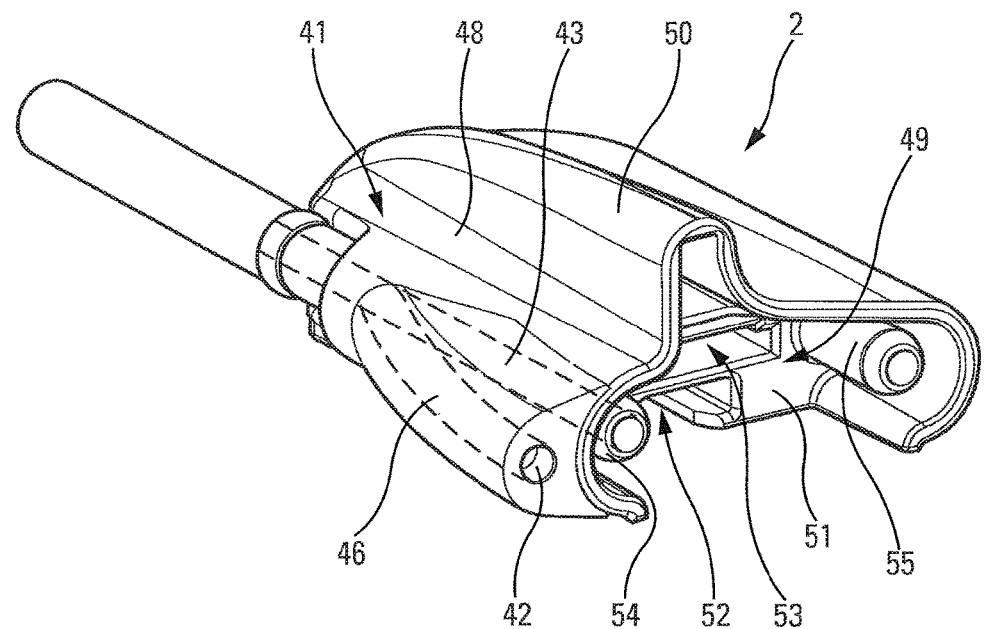
FIG. 7 is a perspective view of the spraying device from FIG. 6.

FIGS. 6 and 7 show an exemplary embodiment of the spraying device 2 installed on the wiper blade shown in FIG. 1. On FIG. 6, the spraying device 2 is mounted threaded onto the second end 7 of the wiper blade 1, while FIG. 7 shows this spraying device 2 independently of the wiper blade.

The spraying device 2 is thus formed by a second cap 41, i.e. a part which is threaded onto the second end 7 of the wiper blade 1 and comes to rest against this. The second cap 41 in particular overlaps the spines, the air deflector 15 constituting the wiper blade 1, and in some cases the support when one is provided for the wiper blade. Such a second end 41 holds at least two of these components together, preferably all three.

According to an exemplary embodiment, the second cap 41 comprises at least one atomisation orifice 42 arranged to spray the washing liquid onto the first zone of the window swept by the wiper blade 1 carrying the second cap 41.

The second cap 41 holds a channel 43 which is in communication on one side with an inlet branch 44 for the washing liquid, and on the other with a first transport pipe 4 for the washing liquid which runs to the level of the wiper blade 1 in order to supply washing liquid to the spraying means.

The inlet branch 44 is made of the same material as the second cap 41. It is arranged to be inserted in a tube forming an exemplary supply device for washing liquid. This inlet branch 44 may comprise a conical sector, to facilitate insertion in the tube 45, and an outer collar which forms a holding means between the tube 45 and the inlet branch 44.

The second cap 41 also comprises a pipe 46 which conducts the washing liquid from the inlet branch 44 to the atomisation orifice 42. According to an exemplary embodiment, this pipe 46 runs into a bulge 47 which opens from a peripheral wall 48 delimiting the second end 41, such a bulge 47 being made of the same material as the peripheral wall 48.

FIG. 7 shows that the second cap 41 has a structure similar to that of the first cap with regard to the mechanical connection between the second cap 41 and the end of the wiper blade.

Thus the second cap 41 comprises a peripheral wall 48 defining an inner volume 49 housing at least the air deflector of the wiper blade. The profile followed by the peripheral wall 48 is complementary to that of the air deflector of the wiper blade. For this reason the spraying device 2 comprises a deflector flank 50 which caps the fin formed on the air deflector of the wiper blade according to the invention.

Inside the inner volume 49 is a block 51, produced integrally with the peripheral wall 48. A groove 52 is arranged in the block 51 to receive the lug of the wiping strip, in a manner similar to the mechanical connection produced between this lug and the wiper blade support.

Between the groove 52 and the peripheral wall 48, the block 51 comprises a hollow 53 housing a longitudinal end of the spine of the wiper blade.

The second cap 41 forming the spraying device 2 comprises the washing liquid circulation channel 43. Such a channel is formed by a concave portion of the second cap 41, this channel 43 also being in communication with the distribution orifice 42, passing via the pipe 46.

In this particular embodiment, the channel 43 is formed firstly straight in the block 51 and secondly in a first protuberance 54 which arises from the block 51 and extends into the inner volume 49. Such a first protuberance 54 is configured to enter into the first pipe formed for example at the air deflector of the wiper blade.

A second protuberance 55 may also arise from the block 51 of the second cap 41, and is then arranged opposite the first protuberance 54 relative to the hollow 53. This second protuberance 55 may be configured to enter into a second pipe formed in the wiper blade, such a technical solution being explained below.

Figure 8:
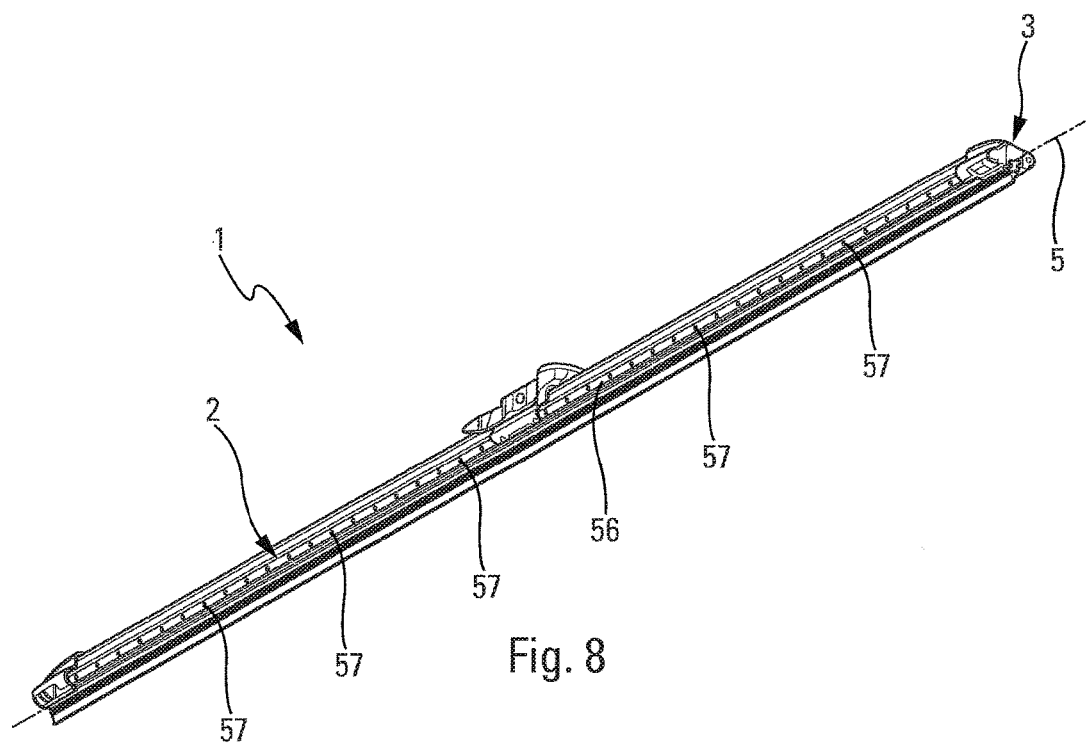
FIG. 8 is a perspective view of a variant embodiment of the wiper blade according to the invention.
Figure 9:
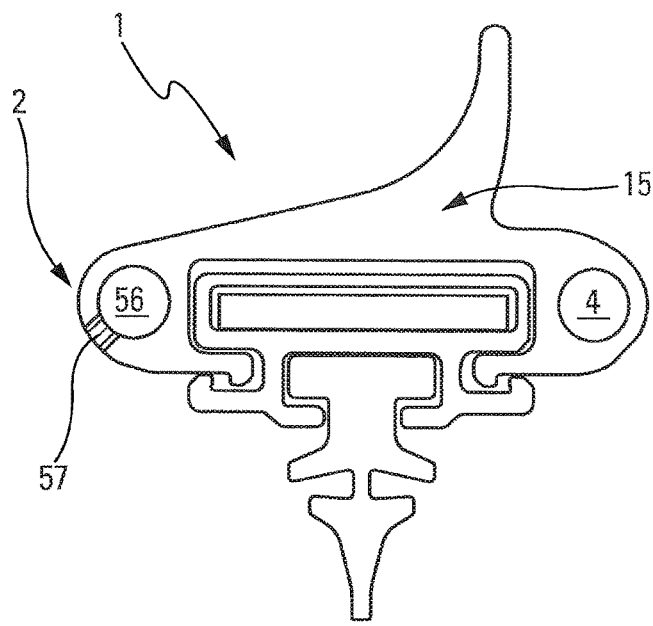
FIG. 9 is a cross-section view of the wiper blade according to the variant embodiment.

FIGS. 8 and 9 show a second exemplary embodiment of a wiper blade 1 according to the invention. Such a second example differs from the embodiment described above by the structure of the spraying device 2. Thus the structure of the wiper blade 1 and the structure of the spraying means 3 are identical to those described above, and reference should be made to the description of FIGS. 1 to 5 for details, with the exception of the description below.

The spraying device 2 is here formed by a second pipe 56 able to conduct the washing liquid. According to a possibility offered by the invention, this second pipe 56 may be in communication with the spraying means 3. According to another possibility, this second pipe 56 may be dedicated—for example exclusively—to the use of the spraying device 2, the first pipe mentioned above then being dedicated—for example exclusively—to the supply of washing liquid to the spraying means 3.

In this exemplary embodiment of the spraying device 2, the washing liquid is sprayed along the longitudinal axis 5 of the wiper blade 1. To do this, the second pipe 56 is provided with a multiplicity of holes 57 arranged along the second pipe 56. The latter and this multiplicity of holes 57 thus form a spray bar which sprays the washing liquid over the zone of the windscreen swept by the wiper blade 1 carrying such a bar.

FIG. 9 shows a cross-section of the wiper blade 1 according to the embodiment in which the wiper blade 1 comprises the first pipe 4 assigned to the spraying means, and the second pipe 56 assigned to the spraying device 2 in the form of the bar, the two pipes being integrated in the wiper blade 1.

In this exemplary embodiment, the two pipes 4, 56 are arranged in the air deflector 15, in particular opposite each other in relation to the stiffening spine 9. The second pipe 56 is fitted with a plurality of atomisation openings, each formed by the hole 57 opening in the second pipe 56. The first pipe 4 is itself connected to the spraying means installed on the wiper blade 1.

Figure 2:
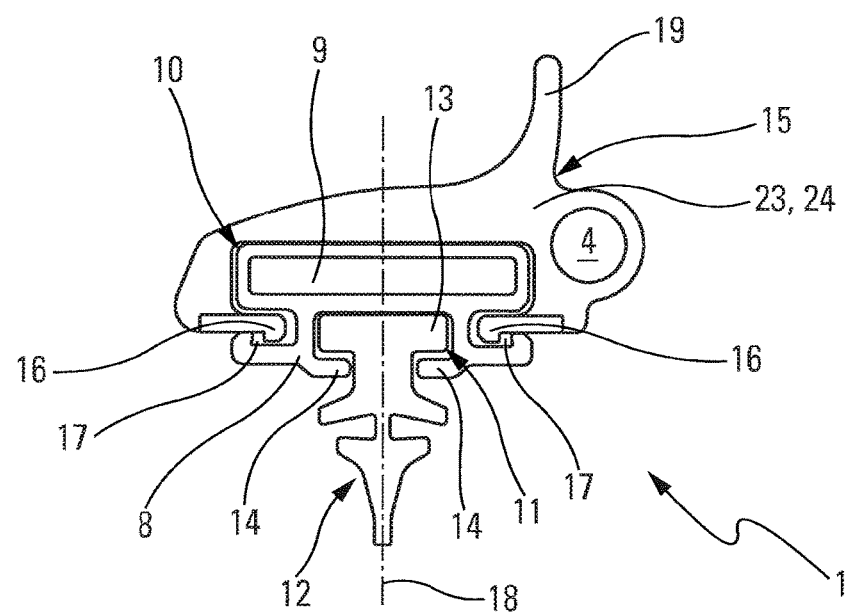
FIG. 2 is a cross-section view of the wiper blade shown in FIG. 1.

The rest of the wiper blade structure 1 is identical to that described with reference to FIG. 2.

Figure 10:
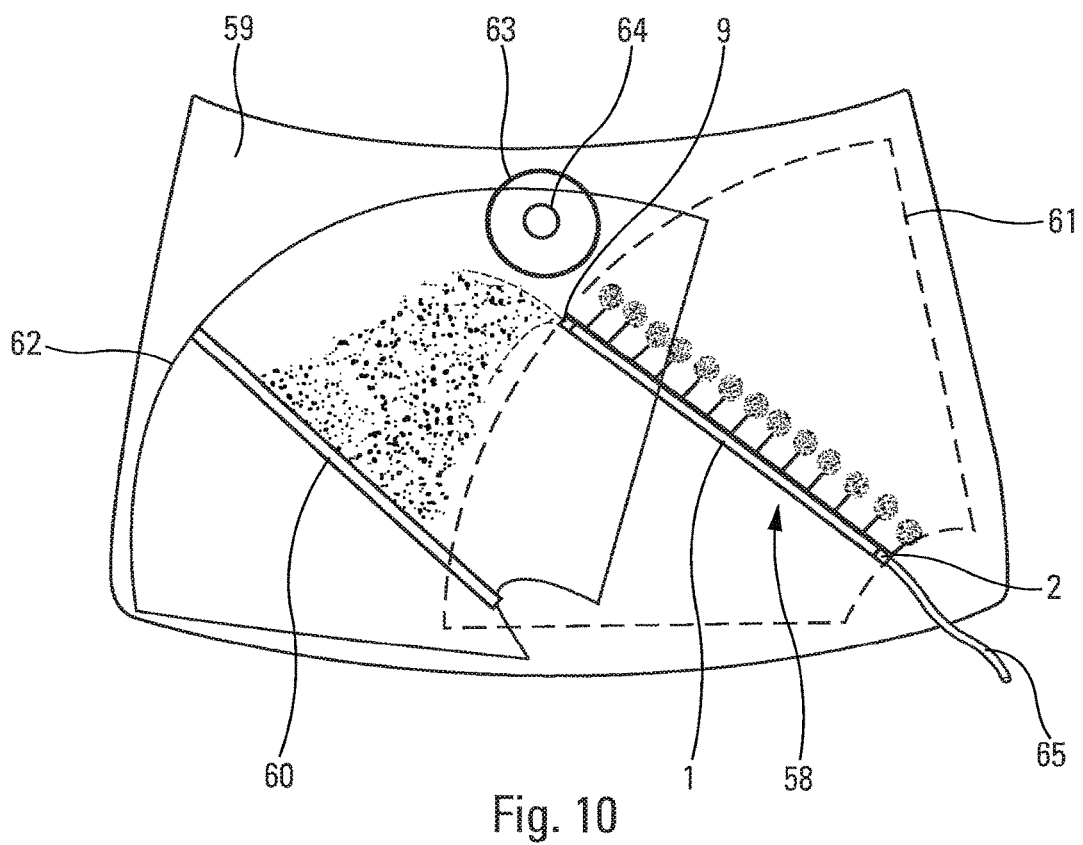
FIG. 10 is a front view of a windscreen equipped with a wiper system comprising at least one wiper blade according to any of the embodiments.

FIG. 10 shows an embodiment of the wiper system 58 according to the invention. Such a system comprises two wiper blades, at least one of which is produced according to any of the descriptions given above. In a complementary fashion, the other wiper blade need not have any washing liquid spraying means.

FIG. 10 shows the window of a vehicle, for example a motor vehicle. Such a window is a windscreen 59 delimited by an inner face turned towards the cabin of the vehicle, and an outer face turned towards the outside of the vehicle.

The wiper system 58 is installed on this windscreen 59 so as firstly to evacuate the water present on the outer face, and secondly to spray a washing liquid onto the same face.

On FIG. 10, the wiper system 58 is illustrated in an operating position i.e. a position where the wiper blade 1, referred to below as the first wiper blade 1, and a second wiper blade 60 are in the process of scraping the outer face of the windscreen 59.

This wiper system 58 thus comprises the first wiper blade 1 intended to wipe the first zone 61 of the windscreen 59, said zone being illustrated by a dotted line which delimits the first zone 61. According to this embodiment, this first zone 61 is on the driver's side of the vehicle, the first wiper blade 1 being configured to be mounted on the driver's side of the vehicle with left-hand drive.

The first wiper blade 1 is connected to a first rotation point via a first arm (not shown), the first wiper blade 1 and the first arm performing a reciprocating motion, wiping the first zone 61. The rotational movement of the first arm is operated by an electric motor, in some cases electronic. The rotational movement may be transmitted directly from the electric motor to the arm but it could also be transmitted indirectly, namely via connecting rods and/or a spreader beam.

The wiper system 58 also comprises the second wiper blade 60, intended to wipe a zone of the windscreen 59 at least in a different part from the first zone 61. This zone swept by the second wiper blade 60 is called the second zone 62 of the windscreen 59, the latter being illustrated by a solid line surrounding the second zone 62. It is noted that the first zone 61 and the second zone 62 of the windscreen 59 overlap at least over the central part of the windscreen 59 delimited by both the solid line and the dotted line.

The wiper system 58 according to the invention is particularly dedicated to cleaning the second zone 62 of the windscreen 59 which does not overlap with the first zone 61 of the same windscreen. The cleaning of the second zone 62 is thus performed by a spraying of washing liquid from the first wiper blade 1, and by a wiping of the second zone by means of the second wiper blade, the latter for example having no system for spraying washing liquid onto the second zone 62 of the windscreen 59.

In a complementary fashion, the invention may comprise the cleaning of the upper part of the second zone 62, this part being surrounded by a circle marked 63 on FIG. 10. This upper part 63 of the second zone 62 of the windscreen 59 contains an element 64 which analyses the state of the windscreen 59 or the state of the road ahead of the vehicle. It may therefore be a rain detector fixed to the inner face of the windscreen 59 and installed at the level of the upper part 63. It may also be a sunshine sensor, a photographic device or a camera, in particular for night vision. It may finally be a detector for fog, dirt or road signs.

According to this exemplary embodiment, the second zone 62 is on the passenger side of the vehicle, the second wiper blade 60 being configured to be mounted on the passenger side of the vehicle with left-hand drive.

The second wiper blade 60 is connected to a rotation point via a second arm (not shown), the second wiper blade 60 and its second arm performing a reciprocating motion while wiping the second zone 62 of the windscreen 59. The rotational movement of the second arm is operated by an electric motor, in some cases electronic. Alternatively the movement may be operated via connecting rods linked to the actuating motor of the first wiper blade 1.

According to an exemplary embodiment, the second wiper blade 60 may be of the scraper and spreader beam type. It may also be a flat blade and comprise a scraper, one or two stiffening spines and in some cases a support.

The wiper system 58 according to the invention may also comprise the device 65 for supplying washing liquid to the windscreen 59. The supply device 65 comprises at least one washing liquid transport tube installed between at least one circulation pump for the liquid and a first wiper blade 1. As mentioned above, this tube may be connected for example to the spraying device 2 or to the connector providing the mechanical connection between the first wiper blade 1 and its first arm.

According to an exemplary embodiment, it is noted that the supply device 65 may include this circulation pump and where applicable a module for managing the circulation of liquid, comprising in particular at least one valve and/or a flap, this management module then being installed between the circulation pump and the first wiper blade 1 and connected to these components by washing liquid transport tubes. The circulation pump extracts the washing liquid from the reservoir arranged on the vehicle.

According to the invention, the first wiper blade 1 is equipped with the washing liquid spraying means 3 arranged on the first wiper blade 1 so as to spray the washing liquid at least onto the second zone 62 of the windscreen 59, and in some cases exclusively onto this second zone 62. The first wiper blade 1 also comprises the spraying device 2 as described above.

In the wiper system 58 according to the invention, the first wiper blade 1, comprising at least the spraying device 2 and the spraying means 3, may be configured to be mounted on the driver's side of the vehicle while the second wiper blade 60 may be configured to be mounted on the passenger's side of the vehicle. This may be the case when the wiper blades are moved in rotation in the same direction on outward travel and on return.

Conversely the first wiper blade 1, comprising at least the spraying device 2 and the spraying means 3, may be configured to be mounted on the passenger's side of the vehicle while the second wiper blade 60 may be configured to be mounted on the driver's side of the vehicle. This may be the case when the wiper blades are mounted in butterfly style, i.e. with an opposing movement of the wiper blades during which the first wiper blade 1 moves in an opposite direction to that of the second wiper blade 60, both on outward travel and on return.

What is claimed:

1. A wiper blade for a window of a vehicle, comprising:
at least one device for spraying a window washing liquid, arranged to spray said washing liquid over a first zone of the window wiped by the wiper blade; and
a means for spraying the washing liquid which is arranged to spray the washing liquid only over one zone of the window different from the first zone, called a second zone, the second zone of the window not being swept by the wiper blade, and
wherein the spraying means is installed at one of two longitudinal ends of the wiper blade to send the washing liquid outside the first zone.

2. The wiper blade of claim 1, wherein at least one first pipe is provided which is able to conduct the washing liquid and is in communication with the spraying means.

3. The wiper blade of claim 2, wherein the first pipe is in communication with the spraying device.

4. The wiper blade of claim 2, wherein a second pipe is provided which is able to conduct the washing liquid and is in communication with the spraying device.

5. The wiper blade of claim 4, wherein the spraying device comprises at least a multiplicity of holes arranged along the first pipe or the second pipe.

6. The wiper blade of claim 4, wherein the second pipe is in communication with the spraying means.

7. The wiper blade of claim 1, wherein the wiper blade extends along the longitudinal axis to have a first end and a second end in the longitudinal axis.

8. The wiper blade of claim 1, further comprising:
a support within which at least one stiffening spine is housed, said support being a plastic part in which a central cavity is arranged, wherein the central cavity is closed at the two longitudinal ends of the wiper blade by the spraying means and the spraying device;
wherein the support comprises a longitudinal housing in which a wiping strip is inserted, and wherein an upper part of the support is covered by an air deflector;
wherein the spraying means is formed by a first cap being fitted on one of said longitudinal ends of the wiper blade, said first cap overlapping at least the at least one stiffening spine and the air deflector; and
wherein the distribution means opening is at a face of the first cap opposite a portion of the first cap through which at least spine and air defector are inserted.

9. A wiper system for a window of a vehicle, comprising:
a first wiper blade, comprising:
at least one device for spraying a window washing liquid, arranged to spray said washing liquid over a first zone of the window wiped by the wiper blade;
a means for spraying the washing liquid which is arranged to spray the washing liquid over at least one zone of the window different from the first zone, called a second zone, the second zone of the window not being swept by the wiper blade,
wherein the at least one device for spraying the first zone is situated parallel to a longitudinal axis along which the wiper blade extends and contained between two longitudinal ends of the wiper blade,
wherein the spraying means is installed at one of said longitudinal ends to send the washing liquid outside the first zone, and
a second wiper blade configured to wipe the second zone of the window.

10. The wiper system of claim 9, wherein the second wiper blade has no system for spraying washing liquid.

11. A wiper blade for a window of a vehicle, comprising:
at least one device for spraying a window washing liquid, arranged to spray said washing liquid over a first zone of the window wiped by the wiper blade;
a means for spraying the washing liquid which is arranged to spray the washing liquid over at least one zone of the window different from the first zone, called a second zone, the second zone of the window not being swept by the wiper blade,
wherein the at least one device for spraying the first zone is situated parallel to a longitudinal axis along which the wiper blade extends and contained between two longitudinal ends of the wiper blade;
wherein the spraying means is installed at one of said longitudinal ends to send the washing liquid outside the first zone, and
wherein the spraying means is a first cap, said first cap being a part which threads onto a first end of the wiper blade and comes to rest against the first end of the wiper blade.

12. The wiper blade of claim 11
wherein the first cap comprising a circulation channel for the washing liquid and at least one distribution means for the washing liquid which is in communication with the circulation channel and arranged to spray the washing liquid over the second zone of the window, and
wherein said first cap is terminated by a face and the at least one distribution means opening is at the face, which is opposite to the wiper blade.

13. The wiper blade of claim 12, wherein the distribution means is a hole opening in a wall of the first cap.

14. The wiper blade of claim 13, wherein the hole opens in the face of the first cap opposite a portion of the first cap through which an end of the wiper blade is inserted.

15. The wiper blade of claim 12, wherein the distribution means is a pierced ball housed in a wall of the first cap.

16. The wiper blade of claim 12, wherein the spraying device comprises at least one second cap installed at one end of the wiper blade, said second cap comprising at least one atomization orifice arranged to spray the washing liquid over the first zone of the window.

17. The wiper blade of claim 11, wherein the wiper blade comprises at least one spine and at least one air deflector, and wherein the first cap overlaps the spines and the air deflector, said first cap holding at least these two components.

* * * * *